United States Patent
DeVoe et al.

(10) Patent No.: US 6,635,719 B2
(45) Date of Patent: Oct. 21, 2003

(54) AMINOPLAST RESIN/THERMOPLASTIC POLYAMIDE PRESIZE COATINGS FOR ABRASIVE ARTICLE BACKINGS

(75) Inventors: Robert J. DeVoe, Oakdale, MN (US); Gregg D. Dahlke, St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 172 days.

(21) Appl. No.: 09/828,058

(22) Filed: Apr. 6, 2001

(65) Prior Publication Data

US 2001/0023158 A1 Sep. 20, 2001

Related U.S. Application Data

(62) Division of application No. 09/218,387, filed on Dec. 22, 1998, now Pat. No. 6,239,049.

(51) Int. Cl.[7] .................... C08L 77/00; C08L 61/28
(52) U.S. Cl. .............. 525/426; 525/424; 525/427; 525/428; 525/429
(58) Field of Search .................. 525/424, 426, 525/427, 428, 429

(56) References Cited

U.S. PATENT DOCUMENTS

| | | |
|---|---|---|
| 2,492,143 A | 12/1949 | Gipple et al. |
| 2,881,064 A | 4/1959 | Rankin et al. |
| 2,931,089 A | 4/1960 | Evans |
| 2,958,593 A | 11/1960 | Hoover et al. |
| 3,256,075 A | 6/1966 | Kirk et al. |
| 3,296,022 A | 1/1967 | Timmer et al. |
| 3,401,491 A | 9/1968 | Schnabel et al. |
| 3,537,121 A | 11/1970 | McAvoy |
| 3,605,349 A | 9/1971 | Anthon |
| 3,772,136 A | 11/1973 | Workman |
| 3,861,921 A * | 1/1975 | Hoffmann et al. |
| 4,047,903 A | 9/1977 | Hesse et al. |
| 4,170,481 A | 10/1979 | Akama et al. |
| 4,255,164 A | 3/1981 | Butzke et al. |
| 4,289,683 A | 9/1981 | Neubert |
| 4,457,766 A | 7/1984 | Caul |
| 4,481,280 A | 11/1984 | Fujikawa et al. |
| 4,547,204 A | 10/1985 | Caul |
| 4,588,419 A | 5/1986 | Caul et al. |
| 4,652,274 A | 3/1987 | Boettcher et al. |
| 4,735,632 A | 4/1988 | Oxman et al. |
| 4,751,138 A | 6/1988 | Tumey et al. |
| 4,773,920 A | 9/1988 | Chasman et al. |
| 4,836,832 A | 6/1989 | Tumey et al. |
| 4,845,162 A * | 7/1989 | Schmitt et al. ............. 525/423 |
| 4,903,440 A | 2/1990 | Larson et al. |
| 4,914,165 A | 4/1990 | Klun et al. |
| 4,950,696 A | 8/1990 | Palazotto et al. |
| 4,967,456 A | 11/1990 | Sternlieb et al. |
| 4,985,340 A | 1/1991 | Palazzotto et al. |
| 5,014,468 A | 5/1991 | Ravipati et al. |
| 5,015,266 A | 5/1991 | Yamamoto |
| 5,055,113 A | 10/1991 | Larson et al. |
| 5,109,097 A | 4/1992 | Klun et al. |
| 5,152,917 A | 10/1992 | Pieper et al. |
| 5,178,646 A | 1/1993 | Barber, Jr. et al. |
| 5,236,472 A | 8/1993 | Kirk et al. |
| 5,256,170 A | 10/1993 | Harmer et al. |
| 5,304,223 A | 4/1994 | Pieper et al. |
| 5,304,224 A | 4/1994 | Harmon |
| 5,378,252 A | 1/1995 | Follensbee |
| 5,417,726 A | 5/1995 | Stout et al. |
| 5,435,816 A | 7/1995 | Spurgeon et al. |
| 5,453,312 A | 9/1995 | Haas et al. |
| 5,454,844 A | 10/1995 | Hibbard et al. |
| 5,490,878 A | 2/1996 | Peterson et al. |
| 5,492,980 A * | 2/1996 | Moriwaki ................. 524/429 |
| 5,549,961 A | 8/1996 | Haas et al. |
| 5,580,634 A | 12/1996 | Stout et al. |
| 5,580,647 A | 12/1996 | Larson et al. |
| 5,609,706 A | 3/1997 | Benedict et al. |
| 5,624,471 A | 4/1997 | Gaeta et al. |
| 5,650,226 A | 7/1997 | Lescaut |
| 5,681,612 A | 10/1997 | Benedict et al. |
| 5,700,302 A | 12/1997 | Stoetzel et al. |
| 5,766,277 A | 6/1998 | DeVoe et al. |

FOREIGN PATENT DOCUMENTS

| | | |
|---|---|---|
| EP | 0 592 941 A2 | 4/1994 |
| EP | 0 592 942 A1 | 4/1994 |
| GB | 2 314 791 A | 1/1998 |
| JP | 01004667 | 9/1989 |
| WO | WO 94/04738 | 3/1994 |
| WO | WO 95/07797 | 3/1995 |
| WO | WO 95/22436 | 8/1995 |
| WO | WO 96/21539 | 7/1996 |
| WO | WO 96/33841 | 10/1996 |
| WO | WO 96/37644 | 11/1996 |
| WO | WO 97/14720 | 4/1997 |
| WO | WO 97/31078 | 8/1997 |
| WO | WO 99/65352 | 12/1999 |

OTHER PUBLICATIONS

Hüls A VEBA Group Company Brochure, "VESTAMELT Copolyamide and Copolyester Hot Melt Adhesives", pp. 1–6.

* cited by examiner

Primary Examiner—Ana Woodward
(74) Attorney, Agent, or Firm—Scott A. Bardell

(57) ABSTRACT

The present invention provides a composition for use in coated abrasives. The curable composition comprises a mixture of: i) from about 30 to about 60 weight percent of an oligomeric aminoplast resin having on average at least one pendant $\alpha,\beta$-unsaturated carbonyl group per oligomeric unit; ii) from about 70 to about 40 weight percent of a thermoplastic polyamide miscible in said aminoplast resin, the weight percents being based on the total resin content; and iii) a sufficient amount of a catalyst for the curable oligomeric aminoplast resin having on average at least one pendant $\alpha,\beta$-unsaturated carbonyl group per oligomeric unit, said catalyst being stable at a temperature of mixing of the components. The curable composition can either be in the form of a melt-processable solid or a molten mixture. The present invention also provides single and multilayered treated backing substrates used in coated abrasives.

7 Claims, No Drawings

AMINOPLAST RESIN/THERMOPLASTIC POLYAMIDE PRESIZE COATINGS FOR ABRASIVE ARTICLE BACKINGS

CROSS REFERENCE TO RELATED APPLICATION

This application is a divisional of U.S. application Ser. No. 09/218,387, filed Dec. 22, 1998, now U.S. Pat. No. 6,239,049.

BACKGROUND OF THE INVENTION

This invention relates to coating compositions for abrasive backings and particularly to those compositions containing an aminoplast resin and a thermoplastic resin.

Coated abrasives generally comprise a flexible backing upon which a binder holds and supports a coating of abrasive grains. The backing can be selected from paper, cloth, film, vulcanized fiber, etc., or a combination of one or more of these materials. The abrasive grains can be formed of flint, garnet, aluminum oxide, alumina-zirconia, ceramic aluminum oxide, diamond, silicon carbide, and the like. Binders are commonly selected from phenolic resins, hide glue, urea-formaldehyde resins, urethane resins, epoxy resins, and varnish. Phenolic resins include those of the phenol-aldehyde type.

Coated abrasives may employ a make coat of resinous binder material in order to secure the abrasive grains to the backing, and a size coat of resinous binder material can be applied over the make coat and abrasive grains in order to more firmly bond the abrasive grains to the backing. The resinous material of the make and size coats may be the same material or may be different materials. A common resinous material used for both make and size coatings is generically referred to as phenolic resin. Phenolic resins are a class of materials made from the reaction of phenol with various aldehydes.

Phenolic resins are commonly used in coated abrasive articles because of their high adhesive strength to abrasive particles, durability, and high thermal stability. There are two types of phenolic resins, resole and novolac. Resole phenolic resins have a molar ratio of formaldehyde to phenol greater than or equal to one to one, typically between 1.5:1.0 to 3.0:1.0. Novolac resins have a molar ratio of formaldehyde to phenol less than one to one.

The phenolic resins contain about 70 percent to about 85 percent solids, and preferably contain about 72 percent to about 82 percent solids. If the percent solids is very low, then more energy is required to remove the water and/or solvent. If the percent solids is very high, then the viscosity of the resulting phenolic resin is too high which leads to processing problems. The remainder of the phenolic resin is preferably water with substantially no organic solvent due to environmental concerns with the manufacturing of substantially no organic solvent due to environmental concerns with the manufacturing of abrasive articles. Examples of commercially available phenolic resins include those known under the trade designations VARCUM and DUREZ, available from Occidental Chemical Corp., Tonawanda, N.Y.; AROFENE and AROTAP, available from Ashland Chemical Company, Columbus, Ohio; RESINOX, available from Monsanto, St. Louis, Mo.; and BAKELITE, available from Union Carbide, Danbury, Conn.

Although phenolic resins are widely used in the coated abrasives industry, phenolic resins do not adhere well to some types of backing materials. Poor adhesion may cause the phenolic binder to peel away or shear off prematurely as the abrasive article is subjected to normal use. This lack of adhesion limits the types of backings that can be used in coated abrasive articles that use phenolic resin binders.

SUMMARY OF THE INVENTION

In one aspect, the invention provides a treated substrate for an abrasive article. The treatment coat, also called a "presize" is made from a binder precursor or curable composition comprising an oligomeric aminoplast resin having on average at least one pendant $\alpha,\beta$-unsaturated carbonyl group per oligomeric unit, a thermoplastic polyamide, and a catalyst for crosslinking or curing the $\alpha,\beta$-unsaturated functionality of the aminoplast resin.

In another aspect, the invention provides a substrate for an abrasive article comprising a) a backing; and b) a crosslinked treatment coat on said backing, said treatment coat is formed from a curable precursor composition comprising a mixture of i) from about 30 to about 60 weight percent of an oligomeric aminoplast resin having on average at least one pendant $\alpha,\beta$-unsaturated carbonyl group per oligomeric unit, ii) from about 70 to about 40 weight percent of a thermoplastic polyamide miscible in said aminoplast resin, the weight percents being based on the total resin content, and iii) a sufficient amount of a catalyst for the curable oligomeric aminoplast resin having on average at least one pendant $\alpha,\beta$-unsaturated carbonyl group per oligomeric unit, said catalyst being stable at the temperature of mixing of the components.

In another aspect, the invention provides a curable precursor composition comprising a) from about 30 to about 60 weight percent of an oligomeric aminoplast resin having on average at least one pendant $\alpha,\beta$-unsaturated carbonyl group per oligomeric unit; b) from about 70 to about 40 weight percent of a thermoplastic polyamide miscible in said aminoplast resin, the weight percents being based on the total resin content; and c) a sufficient amount of a catalyst for the curable oligomeric aminoplast resin having on average at least one pendant $\alpha,\beta$-unsaturated carbonyl group per oligomeric unit, said catalyst being stable at temperature of mixing of the components.

The cured composition is also useful as a make coat, a size coat for coated abrasives, and as a laminating adhesive for multi-layer backing substrates.

In another aspect, the invention provides a treated substrate comprising a substrate which comprises a hydroenhanced cloth and a treatment coat on the substrate. "Hydroenhanced" means that the substrate is treated using high pressure water to increase the surface area of the yarns. An example of this treatment is described in U.S. Pat. No. 4,976,456. The treatment coat may be selected from a variety of compositions suitable for use in abrasive articles.

The term "precursor" means the binder is uncured and not crosslinked. The term "crosslinked" means a material having polymeric sections that are interconnected through chemical bonds (that is, interchain links) to form a three-dimensional molecular network. Thus, the binder precursor is in an uncured state when applied to the backing.

In general, the aminoplast resin/polyamide treatment coat comprises a semi-interpenetrating polymer network of a cured or crosslinked thermosetting polymer and a thermoplastic polymer. As used herein, a "semi-interpenetrating polymer network (semi-IPN)" is defined as a polymer network of two or more polymers wherein at least one polymer is crosslinked and at least one is uncrosslinked.

For purposes of this application, "cured," "crosslinked," and "polymerized" can be used interchangeably. For purposes of this invention, a binder precursor is "energy-curable" in the sense that it can crosslink (that is, cure) upon exposure to radiation; for example, actinic radiation, electron beam radiation, and/or thermal radiation. A binder precursor may be in the form of a molten mixture or may be a solid at room temperature. For instance, a binder precursor may be a solid film that is transfer coated to the backing. Upon heating to elevated temperatures, this binder precursor is capable of flowing, increasing the tack of the hot melt binder precursor, and allowing the hot melt binder precursor to penetrate and bond intimately with the backing substrate. Alternatively, for instance, if the resin is solvent-borne (organic or water), (<100 percent solids) or blended with low molecular weight reactive diluents (100 percent solids), the binder precursor may be liquid at room temperature.

As used herein, a "hot melt"composition refers to a composition that is a solid at room temperature (about 20 to 22° C.) but which, upon heating, melts to a viscous liquid that can be readily applied to a backing. A "melt processable" composition refers to a composition that can transform, for example, by heat and/or pressure, from a solid to a viscous liquid by melting, at which point it can be readily applied to a backing.

Desirably, the aminoplast resin/polyamide binder precursors of the invention can be formulated as solvent free systems (that is, they have less than 1 percent solvent in the solid state). However, if so desired, it may be feasible to incorporate solvent or other viscosity-reducing reactive diluents into the binder precursor.

A "cloth" is a generic term which includes all textile fabrics or felts. A "cloth" as used herein, may contain any of the commonly known textile fibers, natural or manmade, or a combination thereof, and which are formed by weaving, knitting, felting, needling, or other processes known in the textile industry.

A "continuous filament yarn" is a yarn comprising indefinitely long fibers such as those found in silk, or those manufactured fibers which are extruded into filaments and then assembled into a yarn with or without a twist.

The aminoplast resin/polyamide compositions of the invention combine the toughness, the improved adhesion to other resins such as phenolics, and the melt-processibilty of thermoplastic polyamides with the rapid curing, high temperature stability, and phenolic resin compatibility of the oligomeric aminoplast resins. The resulting solventless compositions are processed at moderate temperatures (220–260° F. (104–127° C.)) as compared with typical thermoplastic materials processed in excess of 204° C., and thus allow the use of temperature sensitive backing materials in coated abrasives. The aminoplast resin/polyamide compositions of the invention may also be used as laminating or transfer coating adhesives in composite backings that provide strength and durability similar to that of cloth at less cost.

DETAILED DESCRIPTION OF THE PREFERRED EMBODIMENTS

A preferred binder precursor of the invention contains from about 20 to about 60 weight percent of an oligomeric aminoplast resin having on average at least one pendant α,β-unsaturated carbonyl group per oligomeric unit and from about 40 to about 80 weight percent of thermoplastic polyamide, the weight percent being based on the total resin content of the composition. A more preferred binder precursor of the invention contains from about 30 to about 40 weight percent of an oligomeric aminoplast resin having on average at least one pendant α,β-unsaturated carbonyl group per oligomeric unit and from about 60 to about 70 weight percent of thermoplastic polyamide, the weight percent being based on the total resin content of the composition. A preferred catalyst for the oligomeric aminoplast resins is a free radical producing photoinitiator. The preferred aminoplast resins of the invention are acrylamidomethyl-novolac resins (AMNs).

The binder precursors of the invention preferably contain at least one oligomeric aminoplast resin having on average at least one pendant α,β-unsaturated carbonyl group per oligomeric unit. Aminoplast resins having at least one pendant α,β-unsaturated carbonyl group per oligomeric unit are made by reacting an amino compound with an aldehyde; the resulting product is then reacted with an oligomeric material. Formaldehyde is the preferred aldehyde.

Aminoplast Resins

The preferred oligomeric material is a phenol novolac resin. Typically, the phenol novolac resin is made by reacting a phenol monomer with an aldehyde in the presence of an acid catalyst, with the molar ratio of the aldehyde to phenol being less than one. Examples of aldehydes used to prepare novolacs include formaldehyde, acetaldehyde, propionaldehyde, glyoxal, and furfural. The preferred aldehyde is formaldehyde because of its availability, reactivity, and low cost. A typical phenol novolac resin is illustrated below:

CHEMICAL STRUCTURE A

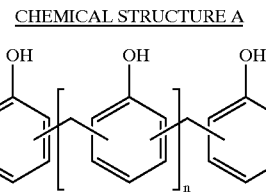

There are essentially no hydroxymethyl groups present for further condensation. Typically, these materials have a molecular weight ranging from about 300 to about 1,500. Additionally, the starting phenol monomer can be substituted with various groups such as alkyl, alkoxy, carboxyl, and sulfonic acid, so long as there are at least two reactive sites remaining to form the novolac.

Instead of using the phenol monomer, other chemicals can be reacted with the aldehyde to produce a novolac type resin. Examples of these chemicals include: cresol, xylenol, resorcinol, catechol, bisphenol A, naphthols, or combinations thereof to form a novolac resin.

To form the oligomeric aminoplast resins of this invention, the aminoplast having hydroxyalkyl groups and the oligomeric material are first combined in a reaction vessel along with an acid catalyst. Representative examples of acid catalysts include trifluoroacetic acid, p-toluenesulfonic acid, and sulfuric acid. Then, the reaction mixture is gently heated to about 30° to 100° C., preferably 70° to 80° C. to bring about any one of the following reactions:

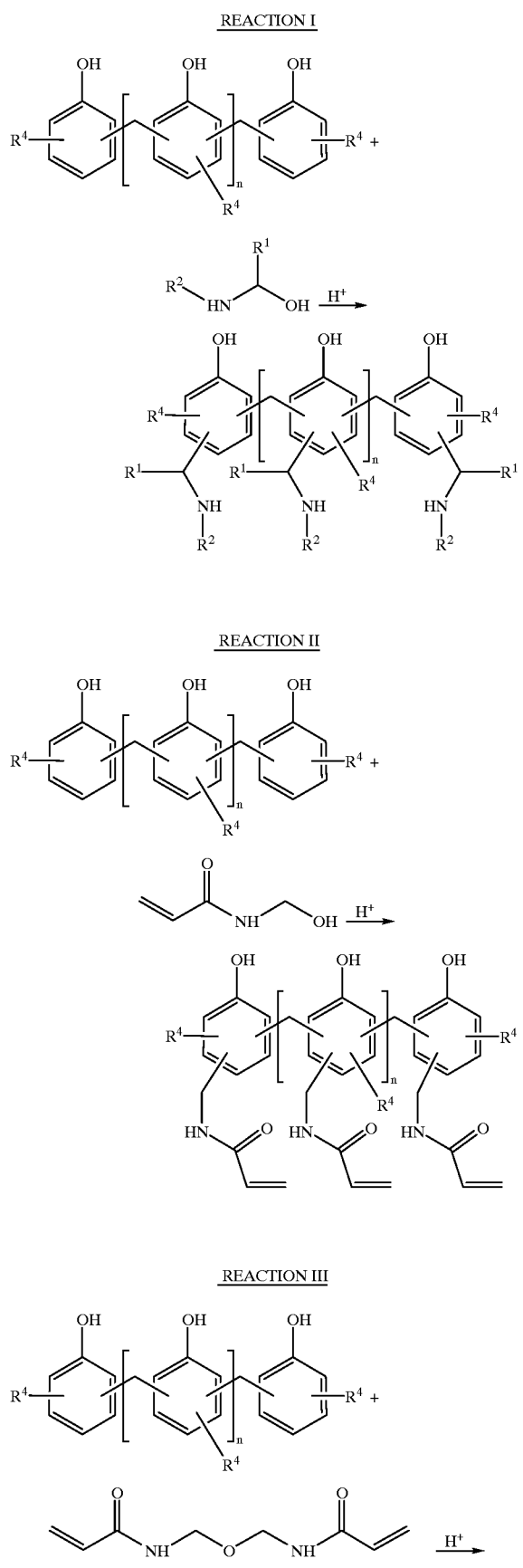

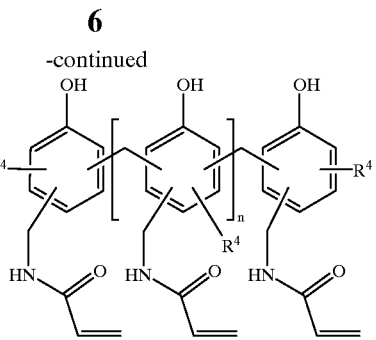

where $R^1$ is as defined above; $R^4$ represents a substituent, or combination of substituents, that does not adversely affect the reaction; $R^5$ represents —OH, —SH, —NH$_2$, hydrogen, alkylamnino group, alkylthio group, alkyl group, or alkoxy group; $R^6$ represents an α,β-unsaturated alkenyl group. The alkylamino, alkylthio, alkyl, alkoxy and alkenyl groups of $R^5$ and $R^6$, preferably have 1 to 20 carbon atoms, inclusive. Examples of substituents suitable for $R^4$ include hydrogen, alkyl group, preferably having 1 to 20 carbon atoms, inclusive, alkoxy group, preferably having 1 to 20 carbon atoms, inclusive, —OH group, mercapto group, and other groups that activate the aromatic ring toward electrophilic substitution. These types of reactions are commonly referred to as Tscherniac-Einhorn reactions.

There may be side reactions and other products formed from Reactions I through III.

Examples of the type of reaction encompassed by Reaction IV can be found in the following references: Zaugg, H. E.; W. B. Martin, "Alpha-Amido alkylations at Carbon", Organic Reactions, Vol. 14, 1965 pages 52 to 77; and Hellmann, H., "Amidomethylation", Newer Methods of Preparative Organic Chemistry, Vol. II, Academic Press (New York and London; 1963), pp. 277–302, both of which are incorporated herein by reference.

In Reactions I through III, the first reactant is a typical example of an oligomeric material. In the reactants in Reactions I through III, n is preferably an integer between 0 and 8, because on both sides of the n group there is a monomeric repeating unit. Thus, when these two monomeric repeating units are added to n, the total number of repeating units is between 2 and 10. Specific compounds and details of their manufacture are found in U.S. Pat. No. 5,236,472, the contents of which are incorporated herein by reference.

A preferred oligomeric aminoplast resin having on average at least one pendant α,β-unsaturated carbonyl group per oligomeric unit is an acrylamidomethyl-novolak resin or AMN. Useful AMNs of the invention have an average acrylamide functionality of from 0.8 to 2.5 acrylamide groups per aromatic ring. Preferred AMNs of the invention include those having an average acrylamide functionality of 1.5–2.0 acrylamide groups per aromatic ring. An even more preferred AMN has an average acrylamide functionality of 1.5 acrylamide groups per aromatic ring. Useful AMNs of the invention have a formaldehyde to phenol ratio (F/P) of from 0.25 to 1.0. The preferred F/P ratio for the AMNs of the invention is 0.5 on a molar basis. The F/P ratio is the molar ratio of formaldehyde to phenol charged in the reactor.

Thermoplastic Polyamides

Compositions of the invention also contain at least one thermoplastic polyamide. The thermoplastic polyamides of the invention are compatible with the oligomeric aminoplast resins in the melt phase. "Compatible" means that the oligomeric aminoplast resin and the thermoplastic polyamide are sufficiently miscible and the melt viscocities of the oligomeric aminoplast resin and the thermoplastic polyamide are sufficiently similar such that a uniform mixture can be obtained with conventional extrusion compounding equipment. The thermoplastic polyamides of the invention have melting points that are lower than the thermal reaction temperature of the oligomeric aminoplast resins. The melting points of the thermoplastic polyamides are below the temperature required to initiate crosslinking of the oligomeric aminoplast resins. Useful thermoplastic polyamides of the invention have a melting point temperature in the range of about 95 to about 150° C. as measured by differential scanning calorimetry (DSC). Preferred thermoplastic polyamides of the invention have a DSC melting point of about 95 to about 110° C., and a more preferred thermoplastic polyamide has a melting point of about 103° C.

The viscocities of the polyamides of the invention are similar to those of the oligomeric aminoplast resins of the invention at the processing temperature of the oligomeric aminoplast resin (about 104–127° C.) Useful thermoplastic polyamides of the invention have a melt flow rate of about 10 to 90 g/10 min, preferably about 15 to 90 g/10 min, more preferably about 50 to 90 g/10 min, and even more preferably about 90 g/10 min, at a temperature of 160° C.

Preferred thermoplastic polyamides are terpolymers produced from lactams and diamines. Preferred polyamides are made from lauryl lactam as one of the monomers. Preferred commercially available thermoplastic polyamides are terpolymers produced from lactams and diamines. The preferred commercially available thermoplastic polyamides have the trade designations VESTAMELT 732, VESTAMELT 730, VESTAMELT 742, VESTAMELT 750/751, VESTAMELT 755, and VESTAMELT 760, and are available from Creanova, Somerset, N.J.

Catalysts

The compositions of the invention contain at least one catalyst for curing the oligomeric aminoplast resin. The oligomeric aminoplast resin can be cured by heat or radiation energy. If the oligomeric aminoplast resin is cured by heat, the temperature of the oven should be set to at least about 120° C. and held at this temperature for at least 4 hours. Curing can be effected in shorter times at higher temperatures. The temperature requirements may be lower depending upon the heat stability of the synthetic or paper backings.

If the oligomeric aminoplast resin is cured by radiation, the amount of radiation depends upon the degree of cure desired of the oligomeric aminoplast resin used in the binder. Examples of radiation energy sources include ionizing radiation, ultraviolet radiation, and visible light radiation. Ionizing radiation preferably has an energy level of 0.1 to 10 megarad, more preferably 1 to 10 megarad. Ultraviolet radiation is electromagnetic radiation having a wavelength of from about 200 to 400 nanometers. Visible light radiation is electromagnetic radiation having a wavelength of from about 400 to 760 nanometers. The rate of curing of the binder composition depends upon the thickness as well as the optical density and nature of the composition.

If the oligomeric aminoplast resin is cured by heat, a thermal initiator can be utilized to facilitate and/or enhance the rate or extent of cure. Examples of useful thermal initiators include peroxides, for example, benzoyl peroxide, azo compounds, benzophenones, and quinones.

If the binder precursor composition is to be cured by ultraviolet radiation, a photoiniator is required to initiate free radicals. Examples of such photoinitiators include organic peroxides, azo compounds, quinones, benzophenones, nitro compounds, acyl halides, hydrazones, mercapto compounds, pyrylium compounds, triacrylimidizoles, bisimidizoles, chloroalkyltriazines, benzoin ethers, benzil ketals, thioxanthones, and acetophenone derivatives. Useful commercially available photocatalysts or photoinitiators include those under the trade designation IRGACURE having product numbers 369, 651, and 961, all available from Ciba Geigy Chemicals, Hawthorne, N.Y.

If the binder precursor composition is to be cured by visible light radiation, a photoinitiator is required to initiate free radical polymerization. Examples of useful visible light photoinitiators can be found in U.S. Pat. No. 4,735,632. Preferably the catalysts are activated by photochemical means.

Optional Components

Optionally, the aminoplast resin/polyamide binder precursor compositions of the invention can further comprise an acrylamidomethyl-phenol resin (AMP). Preferably, the AMP would have a relatively low molecular weight (less than 500), an acrylamide functionality sufficient to provide crosslinking, and sufficient miscibility and viscosity with the oligomeric aminoplast resin and the polyamide so to form a compatible mixture as defined above. Specific AMPs and details of their manufacture are found in U.S. Pat. No. 4,903,440, the contents of which are incorporated herein by reference.

Any known and compatible additive useful in coatings in the abrasives art may be used as long as the amount of the additive used does not adversely affect the performance characteristics of the end-use product or article. Common additives include optically transparent fillers such as feldspar and silica, slip agents, and materials useful for dissipating static charges such as carbon black and graphite.

Backings

Useful backings of the invention may be comprised of cloth, vulcanized fiber, paper, nonwoven materials, fibrous reinforced thermoplastic backing, polymeric films, substrates containing hooked stems, looped fabrics, metal foils, mesh, foam backings, and transfer coated multilayer combinations thereof and are of the appropriate weight for the end use application.

The raw backings can be provided as woven fabrics using yarns composed of natural or synthetic fibers, as polymeric films, or as laminates of different types of polymeric materials, or as laminates of polymeric materials with nonpolymeric materials. The woven polymeric fabrics may have different yarns in the warp and weft directions.

Cloth backings can be porous or sealed and they may be woven or stitch bonded. The cloth backing materials may also be surface treated using high pressure water (hydroenhanced) as described in U.S. Pat. No. 4,967,456, incorporated herein by reference. The effect of the water treatment is to increase the surface area of the yarns which provides a cloth that more readily and uniformly absorbs the desired chemical composition. Such cloths have a uniform surface finish and improved characteristics such as cover, abrasion resistance, drape, and reduced air permeability. The cloth backings may include fibers or yarns of cotton, polyester, rayon, lyocell, silk, nylon, or blends thereof. The yarns may be made of continuous filaments. The cloth backings can be provided as laminates with different backing materials described herein.

Examples of useful commercially available cloth backing materials include polyester fabrics woven with either spun yarns or continuous filament yarns, available from Milliken, Spartanburg, S.C.; and hydroenhanced polyester fabrics, available from Interspan Division of BBA Nonwovens, Fort Mill, S.C.

Paper backings can also be barrier coated, backsized, untreated, or fiber-reinforced. The paper backings also can be provided as laminates with a different type of backing material.

Nonwoven backings include spunbonded webs and laminates to different backing materials mentioned herein. Laminates may include those constructions having a network of filaments adhesively bonded or melt bonded to a nonwoven web. The nonwovens may be formed of cellulosic fibers, synthetic fibers, or blends thereof. Examples of commercially available nonwoven backing materials include TYPAR spunbonded polypropylene and REEMAY spunbonded polyester, available from Typar/Reemay, Old Hickory, Tenn., and STABILON scrims, available from Milliken. A "scrim" is defined as a fabric with an open construction used as a base fabric in the production of coated or laminated substrates.

The foam backing may be a natural sponge material or polyurethane foam and the like. The foam backing also can be laminated to a different type of backing material. The mesh backings can be made of polymeric or metal open-weave scrims. Additionally, the backing may be a spliceless belt such as that disclosed in U.S. Pat. No. 5,609,706, or a reinforced thermoplastic backing that is disclosed in U.S. Pat. No. 5,417,726, both incorporated by reference herein.

Preferred backing materials for use in the coated backings of the invention include cloth backings such as those woven from polyester, cotton, polyester/cotton, rayon, or lyocell yarns.

Preparation

The aminoplast resin/polyamide binder precursor may be prepared by mixing the various ingredients in a suitable vessel at an elevated temperature sufficient to liquefy the materials so that they may be efficiently mixed with stirring, but without thermally degrading them, until the components are thoroughly melt blended. This temperature depends in part upon the particular chemistry. For example, this temperature may range from about 30 to 150° C., typically 50 to 140° C., and preferably ranges from 90 to 125° C. The components may be added simultaneously or sequentially, although it is preferred to first blend the oligomeric aminoplast resin and the thermoplastic polyamide component. Then, the catalysts are added followed by any optional additives including fillers. The binder precursor should be compatible in the uncured, melt phase. That is, there should preferably be no visible gross phase separation among the components before curing is initiated.

The aminoplast resin/polyamide binder precursor may be used directly after melt blending or may be packaged in pails, drums, or other suitable containers, as a solid or a powder, preferably in the absence of light, until ready for use. The binder precursors so packaged may be delivered to a hot melt applicator system with the use of pail unloaders, block melters equipped with rotating screws, and other solids feeding equipment. Alternatively, the hot melt binder precursors of the invention may be delivered to conventional bulk hot melt applicator and dispenser systems in the form of sticks, pellets, slugs, blocks, pillows, or billets. It is also feasible to incorporate organic solvent into the binder precursor; although this may not always be preferred.

It is also possible to provide the hot melt aminoplast resin/polyamide binder precursors of the invention as uncured, unsupported rolls of adhesive film. In this instance, the binder precursor is extruded, cast, or coated to form the film. Such films are useful in transfer coating the binder precursor to an abrasive article backing. It is desirable to roll up the film with a release liner (for example, silicone-coated Kraft paper), with subsequent packaging in a bag or other container that is not transparent to actinic radiation.

The hot melt binder precursors of the invention may be applied to the abrasive article backing by extrusion, gravure printing, coating, (for example, by using a coating die, a heated knife blade coater, a roll coater, a curtain coater, or a reverse roll coater), or transfer coating. When applying by any of these methods, it is preferred that the binder precursor be applied at a temperature of about 80 to 140° C., more preferably from about 100 to 125° C.

The hot melt aminoplast resin/polyamide binder precursors can be supplied as free standing, unsupported films that can be transfer coated to the backing and, if necessary, die cut to a predefined shape before transfer coating. Transfer coating temperatures and pressures are selected so as to minimize both degradation of the backing and bleed through of the binder precursor and may range from room temperature to about 120° C. and about 30 to 1000 psi (0.03 to 1 kPa). A typical profile is to transfer coat at room temperature and about 400–500 psi (0.4 to 0.5 kPa). Transfer coating is a particularly preferred application method for use with highly porous backings.

It is also within the scope of this invention to coat the aminoplast resin/polyamide binder precursor as a 100 percent solids liquid, or from a solvent, although this method is not always preferred. A liquid binder precursor can be applied to the backing by any conventional technique such as roll coating, spray coating, die coating, knife coating, and the like. After coating the resulting binder precursor, it may be exposed to an energy source to activate the catalyst before the abrasive grains are embedded into the binder precursor. Alternatively, the abrasive grains may be coated immediately after the binder precursor is coated before partial cure is effected.

The coating weight of the hot melt aminoplast resin/polyamide binder precursor of the invention can vary depending on the grade of the abrasive particles to be used. In general, the application rate of the binder precursor composition of this invention (on a solvent free basis) is between about 4 to 500 g/m$^2$, preferably between about 20 to about 300 g/m$^2$.

Preferably, the hot melt aminoplast resin/polyamide binder precursor is applied to the abrasive article backing by any of the methods described above, and once so applied is exposed to an actinic, preferably UV, energy source to initiate at least partial cure of the photosensitive materials. The partial curing facilitates further processing, web handling, and prevents the coated side of the backing from sticking to the backside of the backing when the coated backing is in the form of a roll. Final cure may be completed by further processing with an additional energy source, typically thermal energy.

Curing of the hot melt aminoplast resin/polyamide binder precursor begins upon exposure of the binder precursor to an appropriate energy source and continues for a period of time thereafter. The energy source is selected for the desired processing conditions and to appropriately activate the chosen photoactive catalyst system. The energy may be actinic (for example, radiation having a wavelength in the ultraviolet or visible region of the spectrum), accelerated particles (for example, electron beam radiation), or thermal (for example, heat or infrared radiation). Preferably, the energy is actinic radiation.

Suitable sources of actinic radiation include mercury, xenon, carbon arc, tungsten filament lamps, sunlight, and so forth. Ultraviolet radiation, especially from a medium pressure mercury arc lamp, is preferred. Exposure times may be from less than about 1 second to 10 minutes or more (to preferably provide a total energy exposure from about 0.1 to about 10 Joule/square centimeter ($J/cm^2$) depending upon both the amount and the type of reactants involved, the energy source, web speed, the distance from the energy source, and the thickness of the binder precursor to be cured.

The aminoplast resins/polyamide binder precursors may also be cured by exposure to electron beam radiation. The dosage necessary is generally from less than 1 megarad to 100 megarads or more. The rate of curing may tend to increase with increasing amounts of photocatalyst and/or photoinitiator at a given energy exposure or by use of electron beam energy with no photoinitiator. The rate of curing also tends to increase with increased energy intensity.

Treated Hydroenhanced Backing Substrates

The present invention also provides treated backing substrates comprising a backing comprising hydroenhanced cloth and a treatment coat on said backing. The type of cloth that may be hydroenhanced is not limited and may be any type of cloth having the properties required for application in an abrasive article. Such properties include sufficient weight, texture, density, weave, heat, and chemical resistance, etc. Preferred hydroenhanced cloths include those made from polyester, cotton, lyocell, rayon, and polycotton yarns. More preferred hydroenhanced cloths are made from polyester yarns.

The type of treatment coat used on hydroenhanced cloth backing substrates is not limited. The treatment coats may be melt processable, or solvent borne, waterborne or 100 percent solids, and radiation or heat curable. Useful treatment coats for the hydroenhanced backing substrate include those comprising phenolic resins, novolak resins, nitrile latex resins, aminoplast resins having pendant, α,β-unsaturated carbonyl groups, urethane resins, epoxy resins, urea-aldehyde resins, isocyanurate resins, melamine-aldehyde resins, acrylate resins, acrylated isocyanurate resins, acrylated urethane resins, acrylated epoxy resins, bismaleimide resins, polyester resins, and aminoplast resin/thermoplastic polyamide blends as described herein, acrylated oligomer/thermoplastic polyamide blends (as described in copending and co-assigned application Ser. No. 09/219,289, filed Dec. 22, 1998, entitled "Acrylated Oligomer/Thermoplastic Polyamide Presize Coatings for Abrasive Article Backings," incorporated by reference herein, and mixtures thereof.

Preferred treatment coatings comprise melt processable aminoplast resin/thermoplastic polyamide blends and phenolic resins.

The treatment coats for the hydroenhanced backing substrate may also contain a catalyst, photoiniator, or thermal initiator as described above and is known in the art. Such treatment coats may also contain other known and conventional additives such as solvents, fillers, viscosity modifiers, and the like.

The treated hydroenhanced substrates may be prepared by methods listed above and other known conventional methods. The range of coating weights for the treatment coat is the same as described above for the aminoplast resin/polyamide compositions. The treated backing substrates can be used alone or may be a layer in a multilayer substrate made by transfer coating or other known means.

Hydroenhanced cloth backing substrates provide surprisingly improved adhesion to treatment coats and greatly improved flexibility when compared to non-hydroenhanced cloth of the same type.

Objects and advantages of this invention are further illustrated by the following examples, but the particular materials and amounts thereof recited in these examples, as well as other conditions and details, should not be construed to unduly limit this invention.

EXAMPLES

All parts, percentages, ratios etc., in the examples are by weight unless otherwise indicated. The following designations are used throughout the examples:

Glossary

AMN 1.5 and 2.0 acrylamidomethyl-novolak resin (1.5 and 2.0 mole of N-methylolacrylamide/mole of aromatic ring in the resin) made according to the procedure of U.S. Pat. No. 5,236,472, Preparation C, incorporated herein by reference AMP acrylamidomethyl-phenolic resin made according to the procedure of U.S. Pat. No. 4,903,440, Preparation 4

CB Carbon black

CD-1010 cationic triaryl sulfonium salt photoinitiator, available from Sartomer under the designation CD-1010

DVE-3 a vinyl ether monomer available from ISP Co, Wayne, N.J., under the trade designation RAPICURE DVE-3

EP1 a bisphenol A epoxy resin, available from Shell Chemical, Houston Tex., under the trade designation EPON 828 and having an epoxy equivalent weight of 185–192 g/eq E-826 Amine curing agent available from Shell Chemical, Houston, Tex. under the trade designation EPICURE 826

FE203 Iron oxide filler

H-1581 46 percent solids acrylonitrile latex available from B. F. Goodrich, under the trade designation, HYCAR 1581

I-651 2,2-dimethoxy-2-phenyl acetophenone photoinitiator, available from Ciba Geigy, under the trade designation IRGACURE 651

NR-9030 40 percent solids waterborne urethane dispersion available from Zeneca Resins, Wilmington, Mass., under the trade designation NEOREZ R-9030

PETA pentaerythritol triacrylate, SARTOMER SR 444, available from Sartomer, Exton, Pa.

RP-1 a resole phenolic resin having 75 percent solids (non-volatiles)

RP2 a resole phenolic resin having 76 percent solids (non-volatile).

RP3 a resole phenolic having 55 percent solids (non-volatile)

TATHEIC triacrylate of tris(hydroxyethyl) isocyanurate, available from Sartomer, under trade designation SR368

TMPTA trimethylolpropane triacrylate, available from Sartomer, under the trade designation SARTOMER 351

UVI-6990 cationic triaryl sulfonium salt photoinitiator, available from Union Carbide V-732 polyamide thermoplastic pellet, having melting point=105° C., available from Creanova, Inc.

V-4020 a vinyl ether oligomer available from Allied Signal, Morristown, N.J., under the trade designation VECTOMER 4020

Cloth

Hydro hydroenhanced polyester fabric treated by a process described in U.S. Pat. No. 4,967,456, available from Interspan Division of BBA Nonwovens KURALON K-II polyvinyl alcohol fill yarns, available from Kuraray America, Inc., New York, N.Y., and ring-spun polyester warp yarns, available from Milliken PCF filament polyester fill yarns and ring-spun polyester warp yarns, available from Milliken PF polyester cloth woven with ring-spun yarns, available from Milliken Y-weight Cotton is 292 g/m$^2$ sateen weave Y-weight cotton fabric, available from Milliken Paper D Weight 180 g/m$^2$ high tear cylinder paper, available from FiberMark E Weight 220 g/m$^2$ high tear cylinder paper, available from FiberMark F Weight 280 g/m$^2$ cylinder paper, available from FiberMark, Inc., Fitchburg, Mass.

H Weight 400 g/m$^2$ paper, available from Aijo Wiggins USA Inc., Greenwich, Conn.

Nonwoven/Netted Fabrics

REEMAY 70 g/m$^2$ spunbonded polyester mat, available from Typar/Reemay

TYPAR 66 g/m$^2$ spunbonded polypropylene mat, available from Typar/Remay

STABILON 0447 4×4 G-150 fiberglass filaments bonded to 17.5 g/m$^2$ carded polyester mat, available from Milliken STABILON 7172 6×6 G-75 fiberglass filaments bonded to 31.5 g/m$^2$ carded polyester mat, available from Milliken General Preparation of Presized Backings A twin screw extruder with six temperature zones, a pellet feed port, a liquid side feed port, and a vacuum port was used. The screw was starve fed at speeds of 100–250 rpm. The temperature zones ranged from 100–140° C. The V-732 was fed to the throat and allowed to melt in the first zones. The liquid AMN was injected in the side port and allowed to mix. A 26 inch Hg (87.8 kPa) vacuum was applied to remove undesirable volatile material.

The melt was pumped through a 35 centimeter drop die with an adjustable slot. The melt temperature ranged from 105–135° C. The coating was dropped onto a woven cloth substrate, preferably heated to promote better penetration. The adhesion of the coating was further improved by applying pressure in a heated nip. The coat weight and placement of the treatment in the cloth was controlled by the extruder throughput, web speed, roll temperatures and nip pressure. Coat weights for cloth presizes were typically in the range of 33–167 g/m$^2$.

Hand Preparation of Presized Backings

The components of the presize composition were combined in a container and stirred at 125° C. until a uniform melt was obtained.

The backing material to be coated was laid on the table of a knife coating station, about 6 inches (15.2 centimeters) wide. The knife was mounted over the backing material and the gap was set to approximately 3–4 mils (0.076–0.102 millimeter). Both table and knife heating elements were heated to 125° C. A bead of the molten composition was applied to the backing material immediately behind the knife. The backing material was pulled slowly and steadily beneath the knife so as to obtain a uniform coating thickness. The coated backing material was then cured under a bank of two Fusion D UV bulbs set at full power (600 Watts/inch (236 Watts/centimeter)). The web speed during UV exposure was typically between 12 to 20 m/min.

General Preparation of Coated Abrasive Articles

Coated abrasive articles were prepared according to the following procedure:

A presized backing was prepared as described above. A coatable mixture for producing a make coating for the backing was prepared by mixing 64 parts of 75 percent solids phenolic resin (RP1) (48 parts phenolic resin), 52 parts non-agglomerated calcium carbonate filler (dry weight basis), and 4.5 parts water to form a make coating which was 83 percent solids, with a wet coating weight of 239 g/m$^2$. The make coating was applied in each case via roll coating. Next, graded ceramic aluminum oxide particles were electrostatically coated onto the uncured make coating. Then, the resulting constructions received a precure of 20 minutes at 85° C., followed by 70 minutes at 93° C.

A size coating comprising a conventional resole phenolic resin, a filler, and water was applied over the abrasive particles and the make coated via a two roll coater. The resulting product was cured of at a temperature of 79° C. for 30 minutes and 88° C. for 75 minutes and then at 100° C. for 10 hours. The resulting coated abrasive articles were single flexed, that is, passed over a one inch diameter (2.54 centimeters) roller at an angle of 90° to allow a controlled cracking of the make and size coatings. The coated abrasive articles were then converted into coated abrasive belts by methods well known in the art.

Test Methods

90° Peel Test

The coated abrasive sheet to be tested was converted into a sample about 8 centimeters wide by 25 centimeters long. One-half the length of a wooden board (17.78 centimeters by 7.62 centimeters by 0.64 centimeters thick) was coated with an adhesive. The entire width of, but only the first 15 centimeters of the length of, the coated abrasive sample was coated with an adhesive on the side bearing the abrasive material. The adhesive was 3M JET MELT Adhesive #3779 applied with a POLYGUN™II glue applicator, both available from Minnesota Mining and Manufacturing Co, St. Paul, Minn. Then, the side of the sample bearing the abrasive material was attached to the side of the board containing the adhesive coating in such a manner that the 10 centimeters of the coated abrasive sample not bearing the adhesive overhung from the board. Pressure was applied such that the board and the sample were intimately bonded, and sufficient time was allowed for the adhesive to cool or harden cure. For samples to be tested at 250° F. (121° C.), a filled phenolic resin as described above under the heading "General Preparation of Coated Abrasive Articles" was used as an adhesive and the adhesive was cured at 100° C. for about 6 hours.

Next, the sample to be tested was scored along a straight line such that the width of the coated abrasive test specimen was reduced to 5.1 centimeters. The resulting coated abrasive sample/board composite was mounted horizontally in the lower jaw of a tensile testing machine having the trade designation SINTECH, and approximately 1 centimeter of the overhanging portion of the coated abrasive sample was mounted into the upper jaw of the machine such that the distance between jaws was 10.2 centimeters. The machine separated the jaws at a rate of 0.5 cm/sec, with the coated abrasive sample being pulled at an angle of 90° away from the wooden board so that a portion of the sample separated from the board. Separation typically occurs between the cloth treatments and the cloth. The machine charted the force per centimeter of specimen width required to separate the cloth from the treatment coating. The higher the required force, the better adhesion of the treatment coating to the cloth backing.

The force required to separate the treatment was expressed in lbF/in width. It is preferred that the force value be at least 16 lbF/in (28 N/cm), more preferably at least 20 lbF/in (35 N/cm) and even more preferably, at least 30 lbF/in (52.5 N/cm), because inadequate adhesion and weakness at the make coat-backing interface will result in inferior performance particularly under high pressure grinding conditions.

Tensile Tests

The coated abrasive backing or coated abrasive sample to be tested was converted into a 2.5 centimeters by 17.8 centimeters strip. The strip was installed between the jaws of a tensile testing machine known under the trade designation SINTECH so that the jaws were initially separated by a space of 0.5 centimeter. The jaws were pulled apart at a rate of 0.5 cm/sec. The machine direction (MD) strips were taken from the machine direction or the warp direction of the backing sample. The cross direction (CD) strips were taken in the cross direction of the backing sample. Additionally, the percent stretch defined as ([final length minus initial length]/initial length) of the sample was measured at a 45 kg load.

Thompson Grinding Test (Dry)

Grade 80 belts were tested on a Thompson Type C12 grinding machine, available from Waterbury Farrel Technologies, Cheshire, Conn., using 12.7×17.8 centimeters particleboard (3 workpieces at a time laying on the 17.8 centimeters edge). Coated abrasive material converted to 203 centimeters by 6.3 centimeters continuous belts were installed on a Thompson grinding machine. The effective cutting area of the abrasive belt was 2.54 centimeters by 203 centimeters. The workpiece abraded by these belts was particle board, 2.54 centimeters width by 17.78 centimeters length by 10.2 centimeters height. Abrading was conducted along the 2.54 centimeters by 17.78 centimeters face. The workpiece was mounted on a reciprocating table. Speed of the abrasive belt was 610 surface meters per minute. The table speed, at which the workpiece traversed, was 30.5 meters per minute. The downfeed was 1.0 millimeter for the first 1000 passes, then 1.8 millimeters/pass until the belt wore out (determined by loading/burning or high normal forces). The process used was conventional surface grinding wherein the workpiece was reciprocated beneath the rotating abrasive belt with incremental downfeeding between each pass. This grinding was carried out dry. Each belt was used until it became loaded or it burned. This test is designed to measure the lifetime of an abrasive belt when the belt is subjected to a controlled and constant-rate grinding conditions in woodworking applications.

Thompson Grinding Test (Wet)

Coated abrasive material converted to 203 centimeters by 7.6 centimeters continuous belts were installed on the Thompson grinding machine. The effective cutting area of the abrasive belt was 2.54 centimeters by 203 centimeters. The workpiece abraded by these belts was 2.54 centimeters width by 17.78 centimeters length by 10.2 centimeters height. Abrading was conducted along the 2.54 centimeters by 17.78 centimeters face. The workpiece was mounted on a reciprocating table. Speed of the abrasive belt was 610 surface meters per minute. The table speed, at which the workpiece traversed, was 7.6 meters per minute. The downfeed increment of the abrasive belt was 0.15 millimeter/pass of the workpiece. The process used was conventional surface grinding wherein the workpiece was reciprocated beneath the rotating abrasive belt with incremental downfeeding between each pass. This grinding was carried out wet. Each belt was used until it shelled. This test is designed to measure the lifetime of an abrasive belt when the belt is subjected to wet and constant-rate grinding conditions in metalworking applications.

Pressure Pac Shelling Test

Endless abrasive belts (7.6 centimeters×335 centimeters) were tested on a constant rate surface grinder by abrading a 1.9 centimeters diameter face of a 1095 tool steel rod at 5 seconds/rod until the coated abrasive shelled, that is, a substantial amount of the abrasive grit came off of the backing. The experimental error of this test was +/−10 percent. This test is designed to measure the grinding performance of an abrasive belt when the belt is subjected to severe, high pressure grinding conditions in metalworking applications.

EXAMPLES 1–6

The effect of average AMN functionality (F) on adhesion was determined. In each case, a 60/40/1.0 V-732/AMN/1-651 ratio was used as a presize coating on PF polyester backing prior to making the abrasive construction. F is defined as the average number of moles of N-methylolacrylamide/moles of phenol in the AMN. The samples were prepared using the "hot knife" procedure described above.

TABLE 1

| Example | Avg F | Adhesion, N/cm |
|---------|-------|----------------|
| 1 | 0.8 | 34.2 |
| 2 | 1.3 | 43.0 |
| 3 | 1.5 | 54.8 |
| 4 | 1.7 | 47.0 |
| 5 | 2.0 | 47.0 |
| 6 | 2.5 | 36.2 |

The data in Table 1 indicates that an acrylamide/phenol molar ratio (F) of 1.5 is preferred.

EXAMPLES 7–12

Samples of several greige polyester cloths supplied by Milliken were evaluated for stripback adhesion after applying a 60/40/1.0 V-732/AMN/I-651 F=1.5, F/P=0.5 hot melt presize. PCF (continuous filament fill yarns), and KURALON K-II (spun PVA fill yarns) fabrics were coated with the 60/40 V-732/AMN blend described above using hot knife coating equipment, as described above in "General Method of Making Pre-sized Backings". (F/P is the molar ratio of formaldehyde to phenol charged in the AMN resin synthesis.) Standard greige PF was coated with the 60/40 V-732/AMN blend described above as a comparison. Sample preparation involved first the application of the hot melt presize using the "hot knife" procedure described above, followed by following the General Preparation of Coated Abrasives Articles procedure above. Then, the procedure for determining 90° peel was used. Two sets of samples were evaluated to determine whether UV dosage has a significant impact on adhesion of the presized backing to the make coat. Results are shown in Tables 2 and 3.

TABLE 2

Stripback Adhesion (118 W/cm)

| Example | Cloth | Room Temp (N/cm) | Elevated Temp(250° F.) (121° C.) (N/cm) |
|---|---|---|---|
| 7 | Std PF | 42.1 | 35.2 |
| 8 | PCF | 36.2 | 32.3 |
| 9 | KURALON K-II | 62.6 | 49.9 |

TABLE 3

Stripback Adhesion (118 W/cm and 157 W/cm)

| Example | Cloth | Room Temp (N/cm) | Elevated Temp(250° F.) (121° C.) (N/cm) |
|---|---|---|---|
| 10 | Std PF | 42.1 | 32.3 |
| 11 | PCF | 33.3 | 30.3 |
| 12 | KURALON K-II | 66.5 | 64.6 |

The above adhesion values for the KURALON K-II fabric (PVA in fill direction) are excellent. The high temperature adhesion (250° F. (121° C.)) is a particularly important characteristic of utilizing the hot melt composition of the invention as a presize on fabric for a coated abrasive article requiring high heat resistance.

EXAMPLES 13–16

Comparative Examples A–B

The coated abrasive belts for Examples 13–16 and Comparative Examples A and B were made according to the General Procedure for Making Coated Abrasives above. The cloth backings of Examples 13–16 were presized with 175 g/m$^2$ 60/40/1.5 V-732/AMN 1.5/1-651 in hot melt form using an extruder and subsequently backsized with 145 g/m$^2$ 67/33/1.0 RP2/PETA/I-651 at room temperature in the form of a 75 percent solids aqueous solution. The backings of Comparative Examples A–B were saturated with a 44 percent aqueous phenolic/latex solution (85.5/9.5/3.33/1.67 RP2/Hycar 1581/FE203/CB), presized with a 52 percent solids aqueous phenolic/latex solution (90/10 RP3/Hycar 1581, and backsized with a 72 percent aqueous phenolic/latex solution (43/55/1.78/0.22 RP3/CaCO3/FE203/CB).

The make coating for Examples 13–16 and Comparative Examples A and B was 239 g/m$^2$ (wet) of 64 parts RP1, 52 parts calcium carbonate, and 4.5 parts water. The mineral was of 612 g/m$^2$ 50 (ANSI standard B74.18). The size coating was about 285 g/m$^2$ (wet) 42 parts RP1, 68 parts cryolite, and 12 parts water. Examples 13–16 were tested for grinding performance under dry and wet conditions. The results are shown in Tables 4 and 5.

TABLE 4

Pressure Pac Shelling Test

| Lot | Treatment | Cloth | Avg # Bars | % Comparative A |
|---|---|---|---|---|
| Comparative A | Phenolic | PF | 33 | 100 |
| Example 13 | 60/40 V-732/AMN | PF | 29 | 88 |
| Example 14 | 60/40 V-732/AMN | HYDRO | 30 | 91 |

TABLE 5

Wet Thompson, Shelling Endpoint

| Lot | Treatment | Cloth | Avg Cut (g) | % Comparative B |
|---|---|---|---|---|
| Comparative B | Phenolic | PF | 1600 | 100 |
| Example 15 | 60/40 V-732/AMN | PF | 2290 | 143 |
| Example 16 | 60/40 V-732/AMN | HYDRO | 2649 | 166 |

The treated backings of the invention provided comparable performance under dry conditions, and superior performance under wet conditions.

EXAMPLE 17

Comparative Example C

Both polyester cloths were presized with the 60/40/1.0 V-751/AMN 1.5/I-651 hot melt presize described above using an extruder and backsized with RP2/PETA/I-651 described above. Then the grade 50 (metal grinding) coated abrasive articles were made as described above in Examples 13–16. Test evaluation data is in Table 6.

TABLE 6

Pressure Pac Shelling Test: Dry, constant rate (7.6 × 335 centimeters belt)

| Example Description | Backing Type | # Bars Cut | % Comparative C |
|---|---|---|---|
| Comparative C | PF | 35 | 100 |
| Example 17 | HYDRO | 55 | 157 |

The metal grinding performance of Example 17 (using hydroenhanced cloth) of the invention is superior to that of Comparative Example C.

EXAMPLE 18–24

A multilayer or laminate backing was prepared for Examples 18–24 by first coating E Weight paper with from 63–418 g/m$^2$ (depending on the choice of the second substrate) of a 60/40/1.5 V-732/AMN 2.0/I-651 hot melt composition (Coating in Table 7). The materials were compounded as described above in Examples 13–17, or precompounded elsewhere and fed as a single stream into a single screw extruder. The coated paper was then bonded to a nonwoven material as indicated in Tables 7 and 8. The samples were then compressed between at least one set of heated nip rolls. The backing constructions were then cured under two FUSION D UV bulbs (600 W/in) at a rate of 50 feet/min (15.2 m/min).

The make coat, mineral, and size coat for Examples 18–24 and Comparative Examples D–G was make coat: 64 parts of a resole phenolic resin (RP-1) (48 parts dry phenolic resin), 52 parts calcium carbonate filler (dry weight basis), and 4.5 parts water, with a wet coating weight of 105 g/m$^2$; mineral: grade 80 (ANSI standard B74.18) with a coating weight of 231 g/m$^2$; and size coat: 99 parts RP1, 26 parts calcium carbonate and titanium dioxide fillers (dry weight basis), and 14 parts water, with a wet coating weight of about 138 g/m$^2$. Examples 18–24 and Comparative Examples D–H then received a thermal cure of 30 minutes at 79° C. plus 75 minutes at 88° C. followed by 10 hours at 100° C. Examples 21–23 are of the same construction as Examples 18–20, respectively.

The following physical properties were measured on the coated laminate backings. In each column, MD means machine direction, and CD means cross direction.

TABLE 7

Room Temperature Tensile Data

| Material | Tensiles (N/cm, (LbF/in)) (MD/CD) | % Stretch (at break) (MD/CD) | Backing Construction |
|---|---|---|---|
| Example 18 | 264, 142 (151), (81) | 2.6, 6.2 | E Weight Paper/Coating/ TYPAR |
| Example 19 | 208, 82 (119), (46.9) | 2.6, 1.9 | E Weight Paper/Coating/ STABILON 0447 |
| Example 20 | 268, 113 (153), (64.8) | 2.0, 2.2 | E Weight Paper/Coating |
| Comparative D | 415, 175.1 (237), (100) | 2.2, 6.2 | H Weight Paper |
| Comparative E | 502, 186 (287), (106) | 5.2, 11.7 | Y Weight Cotton |

TABLE 8

Elevated Temperature (250° F.) Tensile Data

| Material | Tensile (N/cm, (LbF/in)) (MD/CD) | % Stretch (at break) (MD/CD) | Backing Construction |
|---|---|---|---|
| Example 21 | 142, 77 (81), (44.1) | 2.2, 5.4 | E Weight Paper/Coating/ TYPAR |
| Example 22 | 169, 80 (96.7), (45.8) | 2.5, 2.6 | E Weight Paper/Coating/ STABILON 0447 |
| Example 23 | 128, 60 (73.2), (34.1) | 2.0, 4.1 | E Weight Paper/Coating |
| Comparative F | 243, 111 (139), (63.7) | 1.5, 1.9 | H Weight Paper |
| Comparative G | 245, 104 (140), (59.2) | 3.6, 11.6 | Y Weight Cotton |

The Comparative H belt was Grade commercially available Grade 80 3M XODUST 970 DZ and the Example 24 belt was made as in Examples 19 and 22. Table 9 lists data from the Thompson dry particle board test on belts of Comparative H and Example 24.

TABLE 9

| Belt | Backing Construction | Passes at 1.8 mm | Fn(N) |
|---|---|---|---|
| Comparative H | Y weight cotton | 160 | 356 |
| | | 780 | 1334 |
| Example 24 | E Weight Paper/Coating/STABILON 0447 | 160 | 271 |
| | | 800 | 302 |
| | | 2387 | 1312 |

Fn(N) is defined as Normal Force expressed in Newtons.

Both Example 24 and Comparative Example H achieved a similar burning/loading endpoint.

EXAMPLES 25 and 26

Examples 25 and 26 are coated abrasive samples and were prepared according to the Hand Preparation of Presize Backings and the General Preparation of Coated Abrasive Articles. The presize coating compositions were 20/20/60 AMN/AMPNV-732 (Example 25) and 30/30/40 AMN/AMPNV-732 (Example 26). Both compositions were coated on PF polyester cloth. The F/P ratio and the average acrylamide functionality per aromatic ring of the AMN were 0.35 and 0.8, respectively. The handspread samples were tested for Stripback Adhesion, described above. Example 25 had RT and ET stripback adhesion values of 32 N/cm and 37.5 N/cm. Example 26 had RT and ET stripback adhesion values of 25.4 N/cm and 27.5 N/cm.

EXAMPLES 27–31

Table 10 shows the presize compositions for Examples 27–30 and Comparative Examples I–L. The composition shown for Example 31 and Comparative Example M is for a backsize. The backing used in the Examples was hydroenhanced polyester cloth (PF). The backing used in the Comparative Examples was polyester cloth (PF).

Examples 27–30 and Comparative Examples I–L were presized using a Mayer rod draw down coating method. Example 31 and Comparative Example M were saturated with a composition containing: 59.1 percent RP-2, 10.9 percent H-1581, and 30 percent water, using a conventional dip and squeeze method and the backsize was applied by a conventional knife coating method.

TABLE 10

| Component | Example 27; CE I (wt %) | Example 28; CE J (wt %) | Example 29; CE K (wt %) | Example 30; CE L (wt %) | Example 31; CE M (wt %) |
|---|---|---|---|---|---|
| EP-1 | 53.5 | | | 61.8 | |
| V-4020 | 35.6 | | | | |
| TMPTA | | 50.0 | | | |
| TATHEIC | | 50.0 | | | |
| NR-9030 | | | 53.5 | | |
| H-1581 | | | 46.5 | | |
| E-826 | | | | 33.2 | |
| RP-2 | | | | | 42.1 |
| DVE-3 | 8.9 | | | | |
| CD-1010 | 2.0 | | | | |
| I-369 | | 1.0 | | | |
| 2-ethoxy-ethanol (solvent) | | | | 5.0 | |
| CaCO$_3$ | | | | | 48.0 |
| Water | | | | | 9.9 |

The coated side of each sample above was cured as follows:
Example 27 and Comparative 1: 2 UV passes @ 7.6m/min, 157 W/cm,+15 min, 90° C.
Example 28 and Comparative J: 2 UV passes @ 7.6m/min, 157 W/cm
Example 29 and Comparative K: 15 min, 90° C.
Example 30 and Comparative L: 3 min, 100° C.
Example 31 and Comparative M: 3 min, 110° C. for both coatings Each UV pass was beneath a bank of 2 medium pressure Hg vapor lamps, American Ultraviolet Co., Murray Hill, N.J.

Table 11 shows the backing type and the dry coating weights of the above Examples and Comparative Examples.

TABLE 11

| Sample | Cloth | Dry Coating Weight (g/m²) |
|---|---|---|
| Example 27 | Hydro PF | 136 |
| Comparative Example I | PF | 135 |
| Example 28 | Hydro PF | 152 |
| Comparative Example J | PF | 168 |
| Example 29 | Hydro PF | 110 |
| Comparative Example K | PF | 110 |
| Example 30 | Hydro PF | 150 |
| Comparative Example L | PF | 150 |
| Example 31 | Hydro PF | 187 |
| Comparative Example M | PF | 150 |

Table 12 shows the 90 Degree Peel Adhesion (at 21° C.) results for the above Examples and Comparative Examples.

TABLE 12

| SAMPLE | Peel Adhesion (N/cm) |
|---|---|
| Example 27 | 30.8 |
| Comparative Example I | 28.9 |
| Example 28 | 30.6 |
| Comparative Example J | 16.1 |
| Example 29 | 36.2 |
| Comparative Example K | 27.3 |
| Example 30 | 56.9 |
| Comparative Example L | 38.0 |
| Example 31 | 66.8 |
| Comparative Example M | 32.9 |

The above data show that hydroenhanced backings provide an adhesion performance advantage for a variety of cloth treatment compositions.

Various modifications and alterations of this invention will be come apparent to those skilled in the art without departing from the scope and spirit of this invention, and it should be understood that this invention is not to be unduly limited to the illustrative embodiments set forth herein.

What is claimed is:

1. A curable precursor composition comprising:

a) from about 30 to about 60 weight percent of an oligomeric aminoplast resin having on average at least one pendant α,β-unsaturated carbonyl group per oligomeric unit;

b) from about 70 to about 40 weight percent of a thermoplastic polyamide miscible in said aminoplast resin, the weight percents being based on the total resin content; and c) a sufficient amount of a catalyst for the curable oligomeric aminoplast resin having on average at least one pendant α,β-unsaturated carbonyl group per oligomeric unit, said catalyst being stable at temperature of mixing of the components.

2. The composition of claim 1, wherein the thermoplastic polyamide has a melting point in the range of from about 95° C. to about 150° C. as measured by DSC.

3. The composition of claim 1, wherein the thermoplastic polyamide has a melt flow rate of from 10 to 90 g/10 min at 160° C.

4. The composition of claim 1, wherein the catalyst is a photocatalyst.

5. The composition of claim 1, wherein the composition is a molten mixture or a melt-processable solid.

6. The composition of claim 1, wherein the oligomeric aminoplast resin having on average at least one pendant α,β-unsaturated carbonyl group per oligomeric unit is an acrylamidomethyl-novolak resin.

7. The composition of claim 1 further comprising acrylamidomethyl-phenol.

* * * * *

UNITED STATES PATENT AND TRADEMARK OFFICE
CERTIFICATE OF CORRECTION

PATENT NO. : 6,635,719 B2
DATED : October 21, 2003
INVENTOR(S) : Dahlke, Gregg D.

It is certified that error appears in the above-identified patent and that said Letters Patent is hereby corrected as shown below:

Column 1,
Lines 55-57, delete "substantially no organic solvent due to environmental concerns with the manufacturing of".

Column 6,
Line 42, delete "alkylamnino" and insert in place thereof -- alkylamino --.

Column 8,
Line 20, delete "photoiniator" and insert in place thereof -- photoinitiator --.

Column 12,
Line 5, delete "photoiniator" and insert in place thereof -- photoinitiator --.

Column 13,
Line 34, delete "Aijo" and insert in place thereof -- Arjo --.

Column 16,
Lines 31-32, delete "V-732/AMN/1-651" and insert in place thereof
-- V-732/Amn/I-651 --.

Column 17,
Line 49, delete "V-732/AMN 1.5/1-651" and insert in place thereof
-- V-732/AMN 1.5/I-651 --.

Column 18,
Line 54, delete "Example" and insert in place thereof -- Examples --.

Column 20,
Line 21, delete "AMN/AMPNV-732" and insert in place thereof
-- AMN/AMP/V-732 --.
Lines 21-22, delete "AMN/AMPNV-732" and insert in place thereof
-- AMN/AMP/V-732 --.

UNITED STATES PATENT AND TRADEMARK OFFICE
CERTIFICATE OF CORRECTION

PATENT NO. : 6,635,719 B2
DATED : October 21, 2003
INVENTOR(S) : Dahlke, Gregg D.

It is certified that error appears in the above-identified patent and that said Letters Patent is hereby corrected as shown below:

Column 21,
Line 2, delete "1" and insert in place thereof -- | --.

Signed and Sealed this

Twenty-second Day of March, 2005

JON W. DUDAS
*Director of the United States Patent and Trademark Office*